United States Patent
Chang

(10) Patent No.: US 8,310,619 B2
(45) Date of Patent: Nov. 13, 2012

(54) LCD DEVICE HAVING A SUPPORT STRUCTURE

(75) Inventor: Hu-Sung Chang, Taipei (TW)

(73) Assignee: Asustek Computer Inc., Taipei (TW)

( * ) Notice: Subject to any disclaimer, the term of this patent is extended or adjusted under 35 U.S.C. 154(b) by 1649 days.

(21) Appl. No.: 11/709,693

(22) Filed: Feb. 23, 2007

(65) Prior Publication Data

US 2007/0229728 A1 Oct. 4, 2007

(30) Foreign Application Priority Data

Apr. 4, 2006 (TW) .............................. 95112012 A

(51) Int. Cl.
*G02F 1/1333* (2006.01)

(52) U.S. Cl. ............................................ 349/60; 349/58
(58) Field of Classification Search ............... 349/58–60
See application file for complete search history.

(56) References Cited

U.S. PATENT DOCUMENTS

| | | | | |
|---|---|---|---|---|
| 6,967,668 B2 * | 11/2005 | Byoun et al. | .................... | 345/55 |
| D599,792 S * | 9/2009 | Lin | .............................. | D14/331 |
| 2006/0208145 A1 * | 9/2006 | Chen | ........................ | 248/289.11 |

* cited by examiner

*Primary Examiner* — Dung T. Nguyen
(74) *Attorney, Agent, or Firm* — Birch, Stewart, Kolasch & Birch, LLP

(57) ABSTRACT

An LCD device includes casing; and a support structure connected movably to a lower portion of the casing in such a manner that the support structure is extendible downwardly and outwardly from the lower portion of the casing to support an object thereabove.

15 Claims, 4 Drawing Sheets

LCD DEVICE HAVING A SUPPORT STRUCTURE

FIELD OF THE INVENTION

The present invention relates to a support structure, and more particularly to a support structure for use in an LCD (liquid crystal display) device.

BACKGROUND OF THE INVENTION

Due to rapid development in the electronic technology, an LCD device becomes an indispensable part for a computer set. The LCD device is in great demand at the market due to its lightweight, thin thickness, small volume and low power consumption. The LCD manufacturers have devoted tremendous effort in the researches to increase the dimension of the display panel in addition to upgrade its visual qualities. In addition to the aforementioned facts, for a computer user, he or she generally also takes account of some auxiliary device that can facilitate the utility of the computer as well as its peripheral device. Addition of some useful auxiliary device in the LCD device can attract the consumer so that the sale thereof may be promoted.

Generally, the majority of computer users (students or journalists) require a bookstand nearby when he or she is working on the keyboard. Some document (such as reference book) can be kept on the bookstand to which the user usually glances at for reference. It is relatively inconvenient to keep a reference book and the keyboard simultaneously on the table even though the latter has a relatively large space. Reciprocal glancing at the book and the LCD may result in stiffness and aches at the neck of the user, because the user must continuously turn his head to left and right sides thereof. Long time gazing on the LCD may cause fatigue and tiredness at the eyes and blurring afterward.

In order to solve the aforementioned disadvantages, an external support structure is added to the computer set during the sale of the latter. The offered support structure usually requires a specific implement (such as paper weight) for keeping the paper at the required position, thereby preventing the paper from retrieving to its initial position. Purchasing the specific implement may result in an extra expense. In addition, the specific implement can only keep a book of small thickness, i.e. a relatively thick book may fall off the bookstand and the paper thereof cannot be retained at the required position with the assistance of the specific implement. A sort of clamping means is required to keep the paper at the required position so as to prevent the paper from retrieving to its initial position.

Therefore, it is the object of the PC manufacturers to find and provide a support structure to go along with the PC without purchasing an additional article, thereby solving and eliminating the eyesore-and-neck paining problem mentioned in the preceding paragraphs.

SUMMARY OF THE INVENTION

It is an object of the present invention to provide a support structure for use in an LCD device.

In one aspect of the present invention, an LCD device is provided and includes a casing and a support structure. The support structure is connected movably to a lower portion of the casing in such a manner that the support structure is extendible downwardly and outwardly from the lower portion of the casing to support an object thereabove.

Preferably, the lower portion of the casing is formed with a chamber for receiving the aforesaid support structure.

Moreover, the LCD device further includes at least one pair of upper tongues and at least one pair of lower tongues, which are disposed respectively at two opposite sides of the lower portion of the casing and which are engageable with an upper edge of the support structure.

In addition, the lower portion of the casing has a rear side formed with a pair of guiding grooves extending in an up-and-down direction of the casing. The upper and lower tongues are fixed securely within the guiding grooves and project outwardly therefrom. The support structure is movable along the up-and-down direction of the casing by virtue of the upper and lower tongues. Preferably, the casing and the support structure are made from the same material, such as aluminum.

The support structure is generally L-shaped such that the support structure is capable defining a space in cooperation with the casing for clamping the object when extended outwardly and downwardly from the lower portion of the casing.

In addition, the front side of the casing can be formed with a retention groove at the lower portion thereof and a prop element below the retention groove. The support structure is generally L-shaped such that when the support structure is not in use, a horizontal section of the support structure can be inserted into the retention groove in order to permit propping of a vertical section of the support structure against the prop element, thereby storing the support structure on the casing.

The lower portion of the casing can further be formed with a cavity extending through the prop element for extension of the vertical section of the support structure when the support structure is in use. A coupling member is used coupling the vertical section of the support structure to the prop element so as to permit outward extension of the support structure from the casing.

In a second aspect of the present invention, an electronic device is provided and includes a casing, a vertical section and a horizontal section. The casing has a flat display panel. The vertical section is connected movably to a lower portion of the casing in such a manner that the vertical section is extendible downwardly and outwardly from the lower portion of the casing. A horizontal section extends perpendicularly from the vertical section to define a right angle and a space to receive an object in cooperation with the vertical section.

Note that the aforementioned electronic device further includes a keyboard having a front portion provided with the aforesaid support structure in such a manner that when not in use, the support structure can be retracted into the front portion of the keyboard in order to minimize the dimension thereof. In use, the support structure can be extended frontwardly and outwardly from the front portion of the keyboard.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTIONS OF THE PREFERRED EMBODIMENTS

An LCD device of the present invention is shown and includes a support structure. The support structure is capable of being pulled outwardly from the LCD device, and defines in cooperation with the LCD device a receiving space to keep a book thereon. Moreover, the support structure can also be used in other electronic device or a computer peripheral device (such as a keyboard). Once utilized in the computer peripheral device, the support structure is capable of supporting a book or a document thereon, so as to facilitate in typing at the keyboard. A detailed description of the support structure is given below.

Figure 1A:
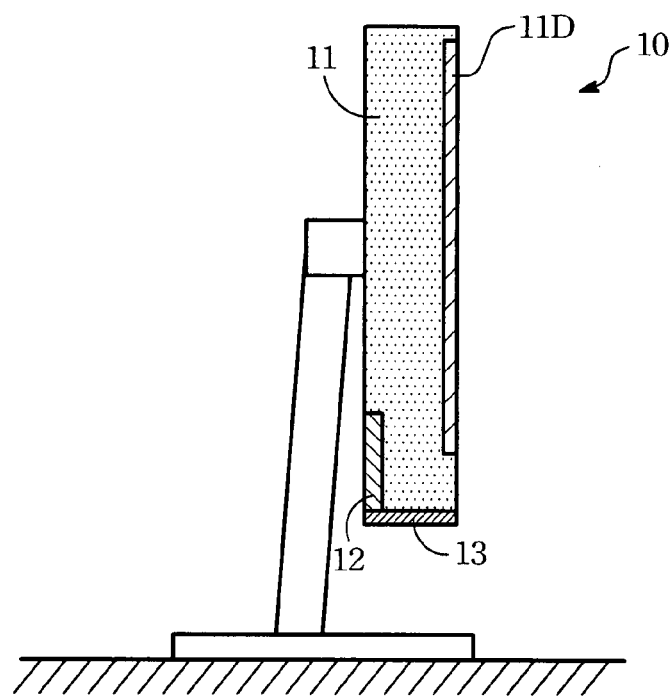
FIG. 1a is a sectional view of the first embodiment of a support structure of the present invention employed in an LCD device.
Figure 1B:
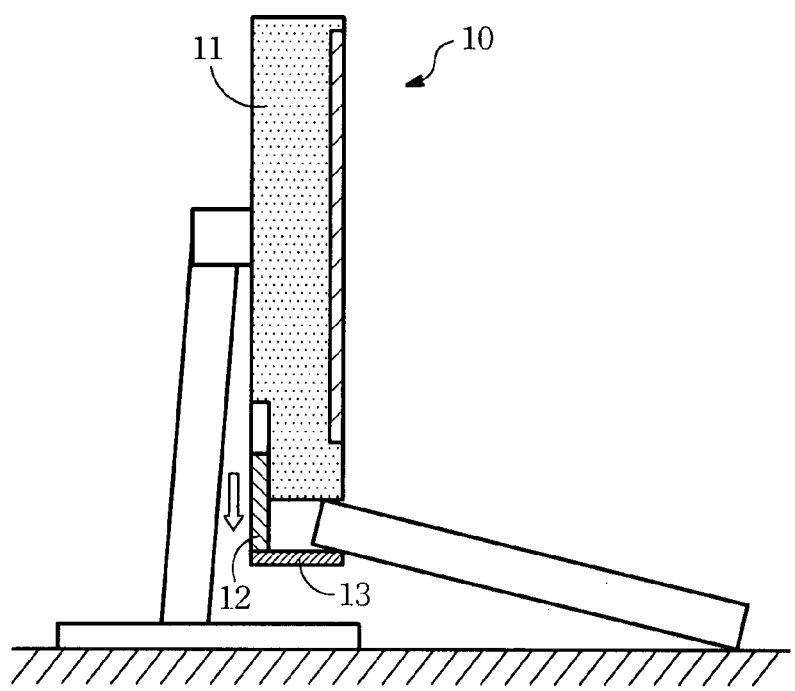
FIG. 1b is a side view, illustrating how the support structure of the present invention supports a book when the LCD device is in use.
Figure 1C:
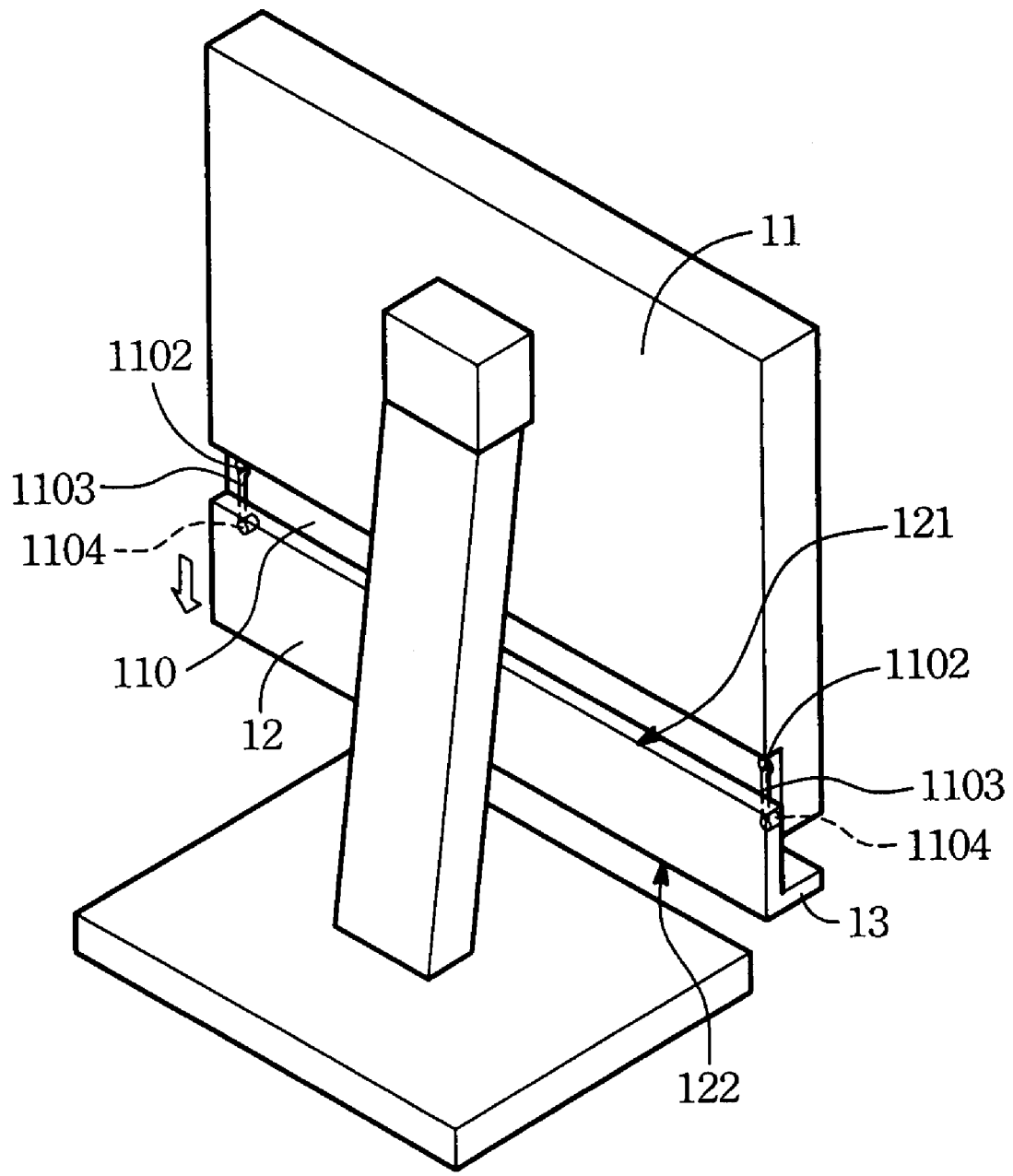
FIG. 1c is a perspective rear view the LCD device provided with the first embodiment of the support structure of the present invention.

Referring to FIGS. 1a to 1c, the first embodiment of the support structure of the present invention is installed to an LCD device 10 or an electronic device. Therefore, the LCD device 10 includes a casing having a rear part 11 and a flat display panel 11D opposite the rear part 11, and the support structure. The support structure is connected movably to a lower portion of the rear part 11 in such a manner that the support structure is extendible downwardly and outwardly from the lower portion of the rear part 11 to support an object thereabove (see FIG. 1b).

The lower portion of the rear part 11 is formed with a chamber 110 at a rear side thereof for receiving the support structure. The chamber 110 is generally rectangular, and has a downward opening. The support structure is generally L-shaped, and includes a vertical section 12 inserted movably into the chamber 110 via the downward opening and a horizontal section 13 extending perpendicularly from the vertical section 12. The vertical section 12 is extendible downwardly and outwardly from the chamber 110 to support an object (such as a book) in cooperation with the horizontal section 13 and the casing (see FIG. 1b). In other words, since the support structure is generally L-shaped, the support structure is capable defining a space in cooperation with the casing for clamping the object when extended outwardly and downwardly from the lower portion of the rear part 11 (see FIG. 1b).

The vertical section 12 has an upper edge 121 and a lower edge 122. The horizontal section 13 extends perpendicularly from the lower edge 122 of the vertical section 12, and is exposed from the chamber 110 once the vertical section 12 is retracted into the chamber 110. In this embodiment, the horizontal section 13 defines a right angle in cooperation with the vertical section 12.

Note the casing and the vertical and horizontal sections 12, 13 can be made from the same material, such as aluminum. Since the vertical and horizontal sections 12, 13 are perpendicular to each other, they are flush with the lower portion of the rear part 11 when retracted into the chamber 110.

The LCD device 10 further includes a pair of upper tongues 1102 and a pair of lower tongues 1104, which are disposed respectively at two opposite sides of the lower portion of the rear part 11, and which are engageable with the upper edge 121 of the vertical section 12 when the vertical section 12 is retracted into the chamber 110 or extended outwardly from the chamber 110. In other words, when the vertical section 12 is retracted into the chamber 110, the upper tongues 1102 engage the upper edge 121 of the vertical section 12 so as to define a first thickness between the lower portion of the rear part 11 and the horizontal section 13. When the vertical section 12 is extended downwardly and outwardly from the chamber 110, the lower tongues 1104 engage the upper edge 121 of the vertical section 12 so as to define a second thickness between the lower portion of the rear part 11 and the horizontal section 13 and simultaneously prevent disengagement of the vertical and horizontal section 12, 13 from the chamber 110. Since the second thickness is greater than the first thickness, the support structure of the present invention is capable of clamping a book with differing thickness in cooperation with the rear part 11.

Figure 2A:
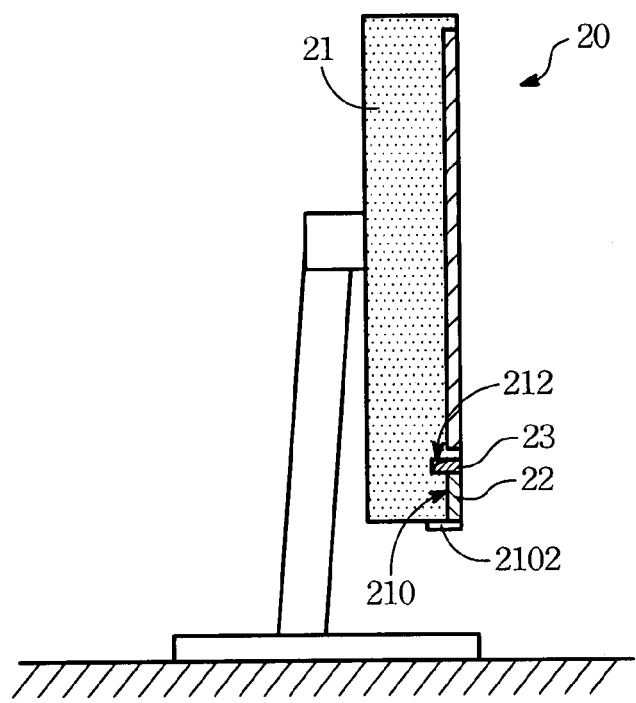
FIG. 2a is a side view illustrating the second embodiment of the support structure of the present invention employed in the LCD device.
Figure 2B:
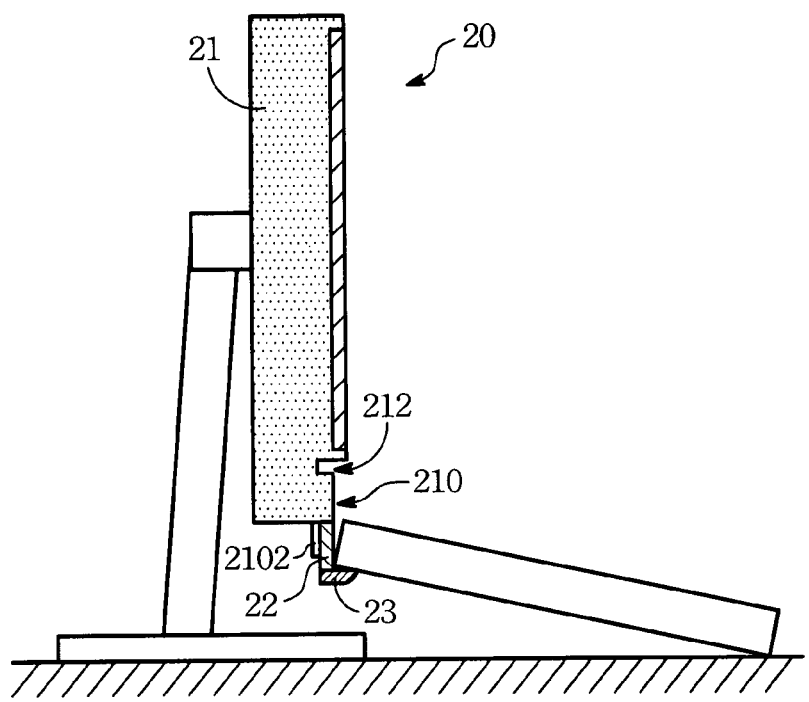
FIG. 2b is a side view, illustrating how the second embodiment of the support structure of the present invention supports a book when the LCD device is in use.

FIG. 2a is a side view illustrating the second embodiment of the support structure of the present invention employed in the LCD device 20. FIG. 2b is a side view, illustrating how the second embodiment of the support structure of the present invention supports a book when the LCD device 20 is in use. The lower portion of the rear part 21 has a front side that is opposite to the rear side and that is formed with a retention groove 212 and a prop element 210 below the retention groove 212. The support structure is generally L-shaped such that the horizontal section 23 can be inserted into the retention groove 212 in order to permit propping of the vertical section 22 of the support structure against the prop element 210 when the support structure is not in use, thereby storing the support structure on the casing.

The LCD device 20 further includes a cavity formed through the prop element 210 and a coupling member 2102. In use, the support structure is removed from the retention groove 212 and is turned upside down (i.e. turn 180 degrees) so as to insert the vertical section 22 into the cavity so as to permit the coupling member 2102 couples the vertical section 22 to the prop element 210, thereby allowing the vertical section 22 to extend outwardly from the cavity to permit resting of the book on the horizontal section 23.

Figure 3A:
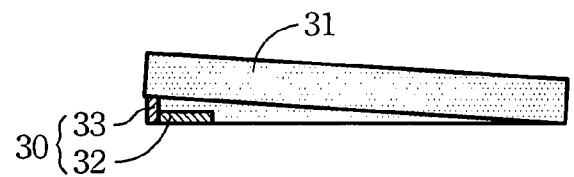
FIG. 3a is a side view, illustrating how the support structure of the present invention is mounted to a keyboard of a PC when the LCD device is in use.
Figure 3B:
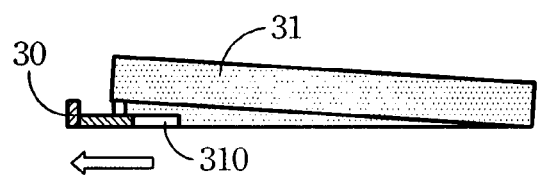
FIG. 3b is a side view, illustrating the support structure of the present invention is pulled outward from the keyboard of a PC when the LCD device is in use.
Figure 3C:
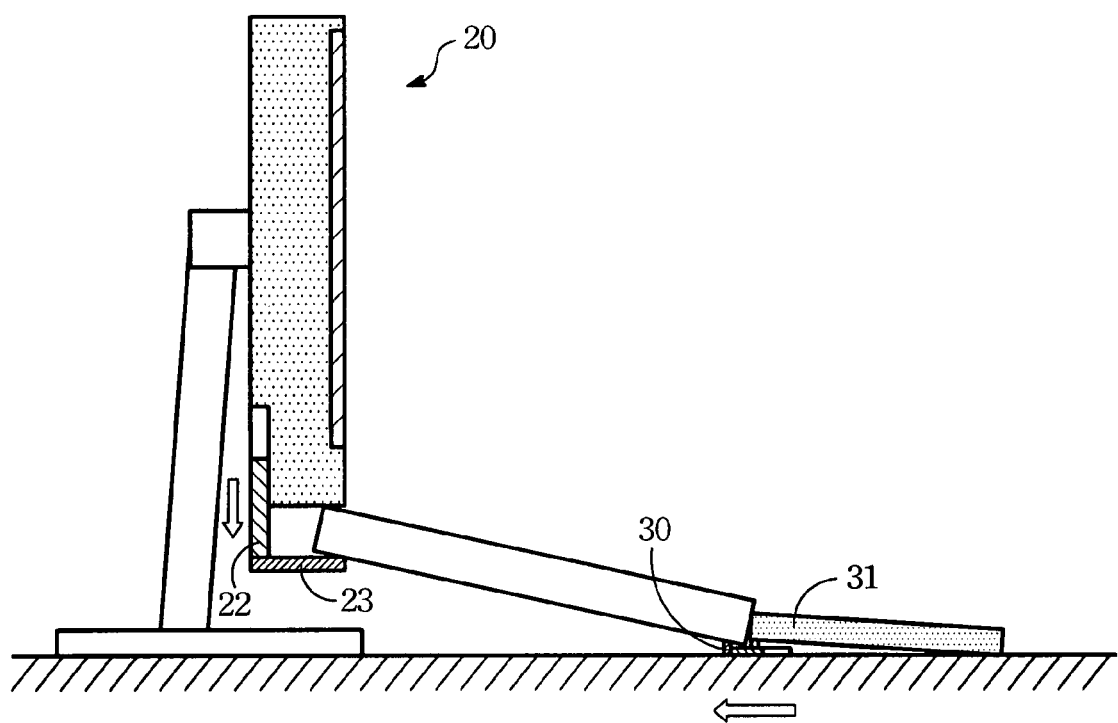
FIG. 3c is a side view, illustrating the support structures of the present invention are pulled respectively from the keyboard and the monitor of the PC in order to support a book thereabove.

Referring to FIGS. 3a, 3b and 3c, in order to provide stable resting of the book between the keyboard 31 and the LCD device 20, an additional support structure 30 can installed to the keyboard 31. As illustrated, the keyboard 31 has a front portion formed a chamber 310. The additional support structure 30 is generally L-shaped, is received in the chamber 310 and is extendible outwardly from the chamber 310 to define a space in cooperation with the vertical and horizontal sections 22, 23 for clamping stably the front and rear ends of the book when the vertical section 23 is extended downwardly and outwardly from the lower portion of the LCD 20, as best shown in FIG. 3c. At this stage, the paper in the book can be kept stably at the desired position due to clamping force provided by the two support structures. Note that the additional support structure 30 has a vertical section 33 and a horizontal section 32 extending perpendicularly from the vertical section 33. When retracted into the chamber 310, the vertical section 33 is flush with the front portion of the keyboard 31.

The advantages provided by the support structure of the present invention are as follows:

(1) When the book is clamped between the LCD and the keyboard with the assistance of the support structure, the book is kept at an inclined position to facilitate the typist for looking at the document;

(2) The paper of the book will not be overturned to an undesired position due to presence of strong wind, since the support structure provides a clamping force in cooperation with the casing. Since the support structure is capable providing different thickness with respect to the casing, the same can clamp a book of differing thickness;

(3) When not in use, the vertical section can be retracted into the chamber in the lower portion of the rear part 11, 21, the outward appearance of the LCD device is not affected. Since the support structure is made from the same material as that of the casing, the support structure has a relatively large strength to support a heavy book;

(4) The presence of the support structure at the LCD device does not hinder the normal operation of the function keys;

(5) The support structure can substitute the conventional bookstand and the user is not required to buy the conventional bookstand, thereby saving the expense. In addition, the support structure can be implemented in the computer peripheral devices, thereby enhancing the utility of the PC.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An LCD device comprising:
   a casing;
   a support structure connected movably to a lower portion of said casing in such a manner that said support structure is extendible downwardly and outwardly from said lower portion of said casing to support an object thereabove; and
   a pair of upper tongues and a pair of lower tongues, disposed respectively at two opposite sides of said lower portion of said casing and being engageable with an upper edge of said support structure.

2. The LCD device according to claim 1, wherein said lower portion of said casing is formed with a chamber for receiving said support structure.

3. The LCD device according to claim 1, wherein said lower portion of said casing has a rear side formed with a pair of guiding grooves extending in an up-and-down direction of said casing, said upper and lower tongues being fixed securely within said guiding grooves and projecting outwardly therefrom, said support structure being movable along said up-and-down direction by virtue of said upper and lower tongues.

4. The LCD device according to claim 1, wherein said casing and said support structure are made from the same material.

5. The LCD device according to claim 1, wherein said casing and said support structure are made from aluminum.

6. The LCD device according to claim 1, wherein said support structure is generally L-shaped such that said support structure is capable defining a space in cooperation with said casing for clamping the object when extended outwardly and downwardly from said lower portion of said casing.

7. The LCD device according to claim 3, wherein said lower portion of said casing has a front side that is opposite to said rear side and that is formed with a retention groove and a prop element below said retention groove, said support structure having generally L-shaped such that a horizontal section of said support structure can be inserted into said retention groove in order to permit propping of a vertical section of said support structure against said prop element when said support structure is not in use, thereby storing said support structure on said casing.

8. The LCD device according to claim 7, further comprising a cavity formed through said prop element for extension of said vertical section of said support structure when said support structure is in use and a coupling member for coupling said vertical section of said support structure to said prop element so as to permit outward extension of said support structure from said casing.

9. The LCD device according to claim 1, wherein said structure is generally L-shaped and includes a horizontal section and a vertical section that extends perpendicularly from said horizontal section and that defines a right angle in cooperation with said horizontal section.

10. An electronic device comprising:
    a casing having a flat display panel;
    a vertical section for connecting movably to a lower portion of said casing in such a manner that said vertical section is extendible downwardly and outwardly from said lower portion of said casing;
    a horizontal section extending perpendicularly from said vertical section to define a right angle and a space to receive an object in cooperation with said vertical section; and
    a pair of upper tongues and a pair of lower tongues, disposed respectively at two opposite sides of said lower portion of said casing and being engageable with an upper edge of said support structure.

11. The electronic device according to claim 10, wherein said lower portion of said casing has a rear side formed with a pair of guiding grooves extending in an up-and-down direction of said casing, said upper and lower tongues being fixed securely within said guiding grooves and projecting outwardly therefrom, said vertical section being movable along said up-and-down direction by virtue of said upper and lower tongues.

12. The electronic device according to claim 10, wherein said casing, said vertical and horizontal sections are made from the same material.

13. The electronic device according to claim 10, wherein said casing and said vertical and horizontal sections are made from aluminum.

14. The electronic device according to claim 10, wherein said vertical and horizontal sections are generally L-shaped such that said vertical and horizontal sections are capable defining a space in cooperation with said casing for clamping the object when extended outwardly and downwardly from said lower portion of said casing.

15. The electronic device according to claim 10, further comprising a keyboard having a front portion formed a chamber, and a support structure that is generally L-shaped, that is received in said chamber and that is extendible outwardly from said chamber to define a space in cooperation with said vertical and horizontal sections for clamping the object when said vertical section is extended downwardly and outwardly from said lower portion of said casing.

* * * * *